United States Patent
Ko et al.

(10) Patent No.: US 8,541,139 B2
(45) Date of Patent: Sep. 24, 2013

(54) HUMIDIFIER INCLUDING AN AUXILIARY HUMIDIFIER UTILZING ELECTROOSMOSIS

(75) Inventors: Haeng Jin Ko, Seoul (KR); Young Bum Kum, Seoul (KR); Young Woo Noh, Gyeonggi-do (KR); Yun Seok Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 326 days.

(21) Appl. No.: 13/014,102

(22) Filed: Jan. 26, 2011

(65) Prior Publication Data
US 2012/0094197 A1    Apr. 19, 2012

(30) Foreign Application Priority Data

Oct. 14, 2010 (KR) .................... 10-2010-0100066

(51) Int. Cl.
*H01M 8/04* (2006.01)
(52) U.S. Cl.
USPC .................. 429/413; 429/414; 429/450
(58) Field of Classification Search
USPC .............. 429/413, 414, 415, 408, 450, 444; 96/52, 60, 80, 83, 294; 55/339, 421
See application file for complete search history.

(56) References Cited

U.S. PATENT DOCUMENTS

| 2003/0165720 A1 | 9/2003 | DeFilippis |
| 2010/0124679 A1 | 5/2010 | Prueitt et al. |

FOREIGN PATENT DOCUMENTS

| JP | 2004103455 A | | 4/2004 |
| JP | 2005098695 A | | 4/2005 |
| JP | 2009-61375 | * | 3/2009 |
| JP | 2009061375 A | | 3/2009 |
| KR | 10-2007-0065871 | | 6/2007 |
| KR | 10-2008-0077598 | | 8/2008 |

* cited by examiner

*Primary Examiner* — Raymond Alejandro
(74) *Attorney, Agent, or Firm* — Edwards Wildman Palmer LLP; Peter F. Corless

(57) ABSTRACT

A humidifier includes an inlet assembly provided in an air exhaust pipe, through which water-supersaturated exhaust gas is discharged from a fuel cell stack, to supply water condensed from the exhaust gas to the fuel cell stack and an outlet assembly provided in an air supply pipe, through which a reactant gas to be humidified and supplied to the fuel cell stack passes, to supply the water transferred through a pumping pipe to the air supply pipe such that the reactant gas is humidified. A pumping pipe including a porous material disposed therein along with electrodes are disposed between the inlet assembly and the outlet assembly so that the water is transferred through a capillary path in the porous material via a pumping force by electroosmosis when the electrodes apply a voltage.

8 Claims, 9 Drawing Sheets

//HUMIDIFIER INCLUDING AN AUXILIARY HUMIDIFIER UTILZING ELECTROOSMOSIS

CROSS-REFERENCE TO RELATED APPLICATION

This application claims under 35 U.S.C. §119(a) the benefit of Korean Patent Application No. 10-2010-0100066 filed Oct. 14, 2010, the entire contents of which are incorporated herein by reference.

BACKGROUND (a) Technical Field

The present invention relates to a humidifier for a fuel cell. More particularly, it relates to a humidifier, which is used as an auxiliary humidifier of a fuel cell together with an existing gas-to-gas humidifier. The humidifier, when used as an auxiliary humidifier, can provide improved humidification performance in a low efficiency region of the gas-to-gas humidifier.

(b) Background Art

A fuel cell is an electricity generation system that does not convert chemical energy of fuel into heat by combustion, but rather electrochemically converts the chemical energy directly into electrical energy in a fuel cell stack. The fuel cell can be applied to the electric power supply of small-sized electrical and electronic devices, for example portable devices, as well as industrial and household appliances and vehicles.

One of the most widely used fuel cells for a vehicle is a proton exchange membrane fuel cell or a polymer electrolyte membrane fuel cell (PEMFC), which includes a fuel cell stack comprising a membrane electrode assembly (MEA), a gas diffusion layer (GDL), a gasket, a sealing member, and a bipolar plate (separator). Generally, the MEA includes a polymer electrolyte membrane and an electrode/catalyst layer disposed on each of both sides of the polymer electrolyte membrane. Hydrogen ions are transported through the polymer electrolyte membrane and an electrochemical reaction takes place in the electrode/catalyst layer. The GDL functions to uniformly diffuse reactant gases and transmit generated electricity. The gasket functions to provide an appropriate airtightness to reactant gases and coolant. The sealing member functions to provide an appropriate bonding pressure. The bipolar plate functions to support the MEA and GDL, collect and transmit generated electricity, transmit reactant gases, transmit and remove reaction products, and transmit coolant to remove reaction heat, etc.

In the case of a PEMFC used in a fuel cell vehicle, water is required for its operation. Since the water serves as a transport medium for hydrogen ions ($H^+$), the humidity of reactant gases is directly related to the performance of the fuel cell. Therefore, the air (or oxygen) as an oxidant supplied to a cathode of the fuel cell stack is humidified at an air inlet of the fuel cell stack by a humidifier.

If the amount of water is insufficient in the PEMFC, the conductivity of the hydrogen ions is reduced, and further the contact resistance between the electrode and the electrolyte membrane is increased by the contraction of the electrolyte membrane. On the other hand, if the amount of water is in excess, a flooding phenomenon, in which water forms on the electrode, occurs to prevent the diffusion of reactant gases, thereby reducing the performance of the fuel cell. Therefore, proper humidification is required to prevent the flooding phenomenon.

The reactant gases supplied to the fuel cell stack are air and hydrogen, and the air is humidified to a necessary extent by the humidifier before it is supplied to the fuel cell stack. The humidified air is introduced into the cathode of the fuel cell stack through an intake manifold to humidify the membrane electrode assembly to increase the ion conductivity, and is then discharged to the air or condensed air through an exhaust manifold.

There are many types of humidifiers such as a bubble-type humidifier, an injection-type humidifier, an absorbent humidifier, etc. However, in the case of the fuel cell vehicle, a membrane humidifier having a relatively low volume is widely used due to limitations in terms of packaging.

The membrane humidifier has some significant advantages in that no separate power is required as well as packaging. Moreover, in the membrane humidifier, the gas supplied to a cathode inlet of the fuel cell stack can receive the exhaust heat and water of the fuel cell stack from hot and humid gas discharged from a cathode outlet.

FIG. 1 is a schematic diagram showing a state in which the air is humidified by a membrane humidifier 120 and supplied to a fuel cell stack 130 in a typical fuel cell system. As shown FIG. 1, the outside dry air is forcibly blown by an air blower 110 to pass through the membrane humidifier 120.

Here, supersaturated humid air discharged from the cathode outlet of the fuel cell stack 130 is passed through the membrane humidifier 120 to humidify the dry air by water exchange between the supersaturated humid air and the dry air, and the humidified air is supplied to the cathode inlet of the fuel cell stack 130.

The typical membrane humidifier is a gas-to-gas humidifier using a hollow fiber membrane, in which the hollow fiber membrane having a large contact surface area can be highly concentrated. Therefore, the fuel cell can be sufficiently humidified by a small capacity membrane humidifier. Moreover, the water and heat contained in the hot gas discharged from the cathode of the fuel cell stack can be collected and reused by the membrane humidifier, thus saving water and energy used in the humidification.

Various fuel cell systems including an auxiliary humidifier as well as the membrane humidifier to improve the humidification performance and the output performance of the fuel cell stack are described.

Korean Patent Publication No. 10-2008-0042614 describes a hybrid humidification system which comprises an outlet formed in a membrane humidifier such that condensed water discharged through the outlet of the membrane humidifier is stored in a water reservoir and can be injected into the air supplied to a fuel cell stack by an injection pump and an injector when a high output of the fuel cell stack is required, thus increasing the amount of humid air.

U.S. Pat. No. 6,696,192 describes a fuel cell system comprising a water connecting apparatus and an auxiliary humidifier in addition to a membrane humidifier. The water collecting apparatus comprises a vapor-liquid separator and a water storage tank. The auxiliary humidifier comprises a water pump, a check valve, a pipe, and an injector. Water collected in the water storage tank is atomized by the injector and then injected into a fuel cell stack.

As such, the technique of separating water from the exhaust gas and injecting an appropriate amount of water into the supplied gas using the injector is used to improve the humidification performance when the amount of heat and water is not enough during high power operation or during start-up of the fuel cell.

U.S. Pat. No. 7,258,937 describes a fluid flow system comprising an air supply compressor, a vapor-liquid separator, a metering device, an injector, and a controller. The compressor sucks and compresses a mixture of fresh air and humid exhaust gas from a fuel cell stack and supplies the mixture to the fuel cell stack, and the injector injects water separated from the exhaust gas into the mixture in the compressor.

The water injected into the mixture is vaporized by the compression heat of the air to cool the compressor and, at the same time, humidifies the air. It is difficult to sufficiently humidify the air supplied to the fuel cell stack by directly injecting water into the compressor, and thus only a required amount of water is directly injected into the mixture of fresh air and exhaust gas to prevent the reduction in efficiency of the fuel cell system.

However, the above-described conventional humidification systems have the following problems.

(1) The gas-to-gas humidifier is a non-powered humidifier which can collect and reuse the exhaust heat and water from the fuel cell stack at the same time, and thus its efficiency is high. However, since it employs manual humidification, a low efficiency is expected due to the structural properties.

(2) In the case where the injection technique is employed to overcome the low efficiency of the existing gas-to-gas humidifier, the system is complicated by auxiliary devices such as a water reservoir for injection, vapor-liquid separator, injector, injector chamber, pipe, controller, injection volume measurement device, sensors, etc. Thus, the volume, weight, manufacturing cost, noise, etc., are increased. Moreover, there are difficulties in determining the appropriate injection time and amount of the injector in the humidification system comprising the vapor-liquid separator (i.e., water separator), high pressure compression, and injector injection.

(3) To facilitate the humidification, it is necessary to inject microdroplets, and thus it is necessary to increase the injection pressure, use a high pressure pump, ensure the capacity of the water tank, and control the water level. Moreover, in the case where the capacity of the vapor-liquid separator is increased, it is disadvantageous in terms of packaging, the cooling efficiency is unsatisfactory, and thus the deterioration in cooling performance of the fuel cell vehicle is further increased.

(4) To prevent freezing of the water reservoir when the air temperature is below 0° C. such as in winter, antifreezing means such as heating and insulation is required, which causes a delay in start-up due to the heating and increases the power consumption of a battery.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. Accordingly, the present invention provides a humidifier for a fuel cell, which is used as an auxiliary humidifier. In particular, the humidifier for a fuel cell is used as an auxiliary humidifier together with an existing gas-to-gas humidifier to improve humidification performance, particularly in a low efficiency region of the gas-to-gas humidifier. As such, the output of the fuel cell is increased and high efficiency operation is provided.

According to aspects of the present invention, provided is a humidifier for a fuel cell, which has a simpler structure than an existing humidifier using an injection technique. It is, thus, possible to reduce the volume, weight, manufacturing cost, noise, etc. and facilitate its control.

In one aspect, the present invention provides a humidifier for a fuel cell, the humidifier comprising: an inlet assembly provided in an air exhaust pipe (such as in the middle of the pipe or otherwise suitably disposed), and through which water-supersaturated exhaust gas is discharged from a fuel cell stack to supply water condensed from the exhaust gas to the fuel cell stack; an outlet assembly provided in an air supply pipe (such as in the middle of the pipe or otherwise suitably disposed), and through which a reactant gas to be humidified and supplied to the fuel cell stack passes, to supply the water transferred through a pumping pipe to the air supply pipe such that the reactant gas is humidified; and a pumping pipe including a porous material disposed therein, and electrodes for applying a voltage to both ends of the porous material and disposed between the inlet assembly and the outlet assembly such that the water is transferred through a capillary path in the porous material with a pumping force by electroosmosis when the electrodes apply a voltage.

In a preferred embodiment, each of the inlet assembly and the outlet assembly comprises a connecting pipe provided between the air exhaust pipe and the air supply pipe and a port branched from the connecting pipe and connected to an end of the pumping pipe.

In another preferred embodiment, each of the ports comprises a porous material disposed therein, and electrodes for applying a voltage to both ends of the porous material such that the water is transferred through a capillary path in the porous material with a pumping force by electroosmosis when the electrodes apply a voltage.

In still another preferred embodiment, each of the electrodes comprises a conductive plate having a mesh structure in which a plurality of through holes are formed, through which the water passes, and a lead connected to a conducting wire for applying a voltage and extending externally.

In yet another preferred embodiment, the inlet assembly is provided in the air exhaust pipe connected to a cathode outlet of the fuel cell stack. Further, the outlet assembly is provided in the air supply pipe connected to a cathode inlet of the fuel cell stack. As such, the air supplied to a cathode of the fuel cell stack is humidified.

In still yet another preferred embodiment, the outlet assembly is provided in the air supply pipe in front or rear of a main humidifier for humidifying the air supplied to the cathode of the fuel cell stack.

In a further preferred embodiment, the inlet assembly comprises a cooling means for cooling a wall, through which the water-supersaturated exhaust gas passes, thus increasing the amount of water condensed on the wall.

In another further preferred embodiment, the cooling means comprises: a fixing bracket fixed to the periphery of the connecting pipe of the inlet assembly connected to the air supply pipe and spaced from the periphery of the connecting pipe by a spacing member; and an ultrasonic vibrator provided on the fixing bracket, wherein the cooling means is an ultrasonic cooling means using acoustic streaming induced by ultrasonic vibration when electric power is applied to the ultrasonic cooling means.

In another aspect, the present invention provides a fuel cell system comprising the above-described humidifier, wherein an inlet assembly of the humidifier is provided in an air exhaust pipe connected to a cathode outlet of a fuel cell stack and an outlet assembly of the humidifier is provided in an air supply pipe connected to a cathode inlet of the fuel cell stack, thus humidifying the air supplied to a cathode of the fuel cell stack.

In a preferred embodiment, the outlet assembly is provided in the air exhaust pipe in front or rear of a main humidifier for humidifying the air supplied to the cathode of the fuel cell stack such that the humidifier is used as an auxiliary humidifier for humidifying the air together with the main humidifier.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
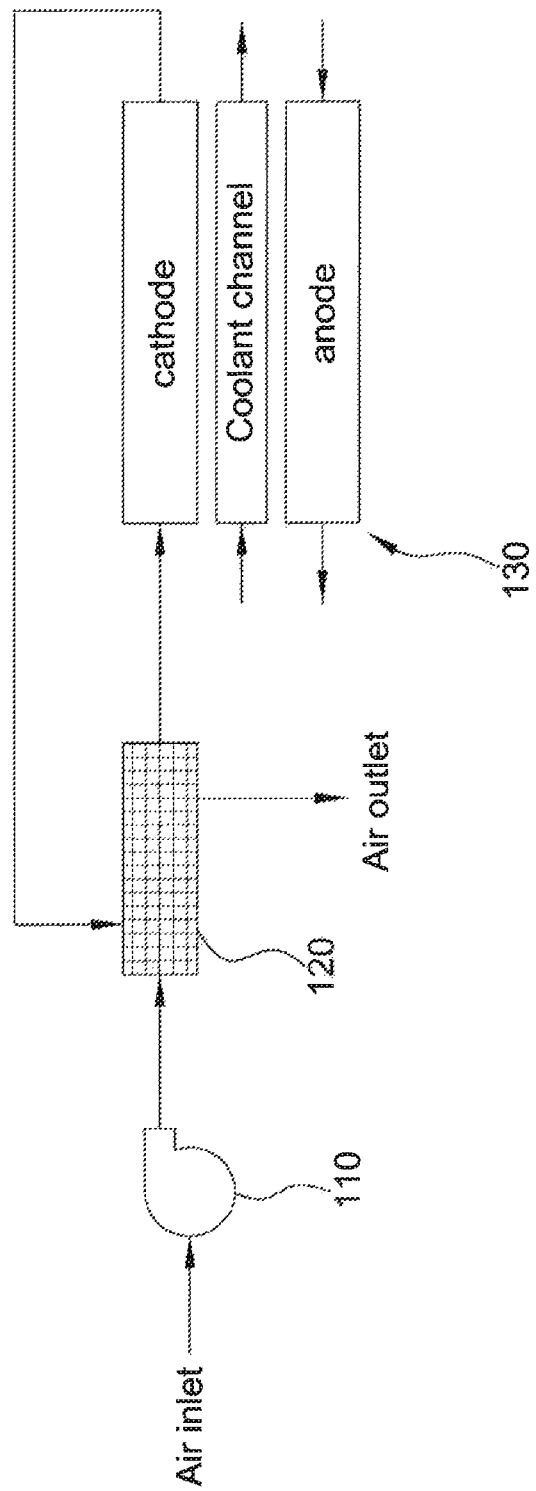
FIG. 1 is a schematic diagram showing a state in which the air is humidified by a membrane humidifier and supplied to a fuel cell stack in a typical fuel cell system.

Reference numerals set forth in the Drawings includes reference to the following elements as further discussed below:

| | |
|---|---|
| 10: fuel cell stack | 20: air supplier |
| 21: air supply pipe | 22: air exhaust pipe |
| 23: main humidifier (membrane humidifier) | |
| 24: hollow fiber membrane | 30: inlet assembly |
| 31: connecting pipe | 32: outlet port |
| 33: porous material | 34: electrode |
| 35: lead | 36: through hole |
| 40: outlet assembly | 41: connecting pipe |
| 42: inlet port | 43: porous material |
| 44: electrode | 45: lead |
| 46: through hole | 50: pumping pipe |
| 51: pipe | 52: porous material |
| 53: electrode | 54: lead |
| 55: through hole | 60: cooling means |
| 61: spacing member | 62: fixing bracket |
| 63: ultrasonic vibrator | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a new type of humidifier, which is used as an auxiliary humidifier. In particular, the present invention provides an electroosmotic humidifier for a fuel cell, which is used as an auxiliary humidifier together with an existing gas-to-gas humidifier.

The gas-to-gas humidifier which may be used as a main humidifier in the present invention may be a membrane humidifier using a hollow fiber membrane. Of course, other known humidifiers could also suitably be used. Thus, while various embodiments may be particularly described herein in connection with a membrane humidifier, it is understood that various other types of humidifiers could be used in place of the membrane humidifier.

In the case where the humidifier of the present invention is further provided in addition to the humidifier (e.g. membrane humidifier), it is possible to improve humidification performance in a low efficiency region of the humidifier (e.g. membrane humidifier), thereby increasing the output of the fuel cell and providing high efficiency operation.

According to various embodiments, the humidifier of the present invention uses electroosmosis, in which water collected from water-supersaturated exhaust gas (i.e., supersaturated humid air) of a fuel cell stack is allowed to flow by electroosmosis to humidify the air.

In some embodiments, in the humidifier of the present invention, water droplets are collected from the exhaust gas at a relative humidify of 100% or more discharged from the fuel cell stack without the use of a separate vapor-liquid separator and are then transferred to an air supply pipe by electroosmosis.

Figure 2:
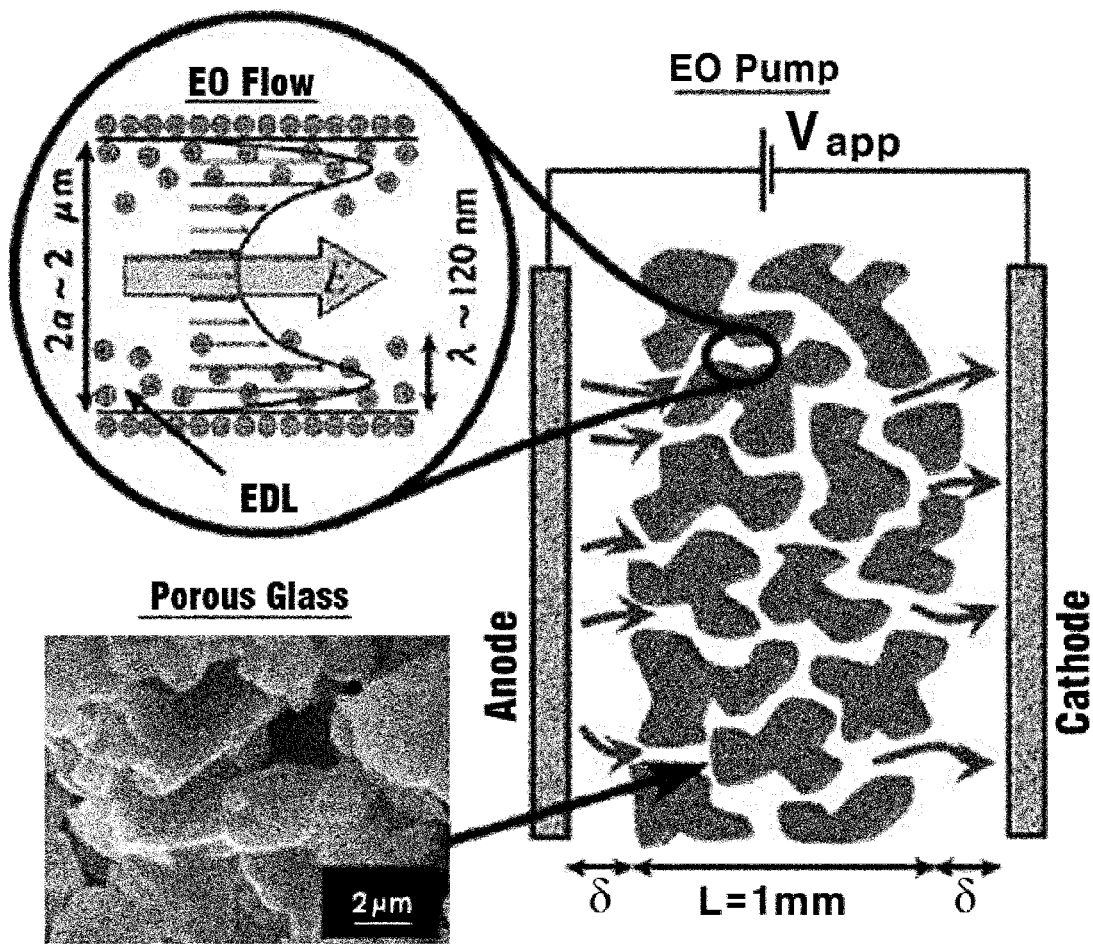
FIG. 2 is a diagram showing the electroosmotic phenomenon, which is the operation principle according to an embodiment of the present invention.

FIG. 2 is a diagram showing the electroosmotic phenomenon, which is the operation principle according to various embodiments of the present invention. As shown in FIG. 2, the electroosmotic phenomenon is caused by a difference in voltage, in which a flow path of liquid is formed with a porous wall or capillary tube and electrodes are provided at both sides thereof to apply a voltage such that the liquid flows along the flow path from one electrode (i.e., positive electrode) to the other electrode (i.e., negative electrode).

Here, water ions are concentrated by a potential difference formed on the porous solid to form a double layer having electrical properties, and the concentrated water flows along the capillary path in the porous solid by the potential difference, in which the flux is proportional to the potential difference and the cross-sectional area of the path.

Figure 3:
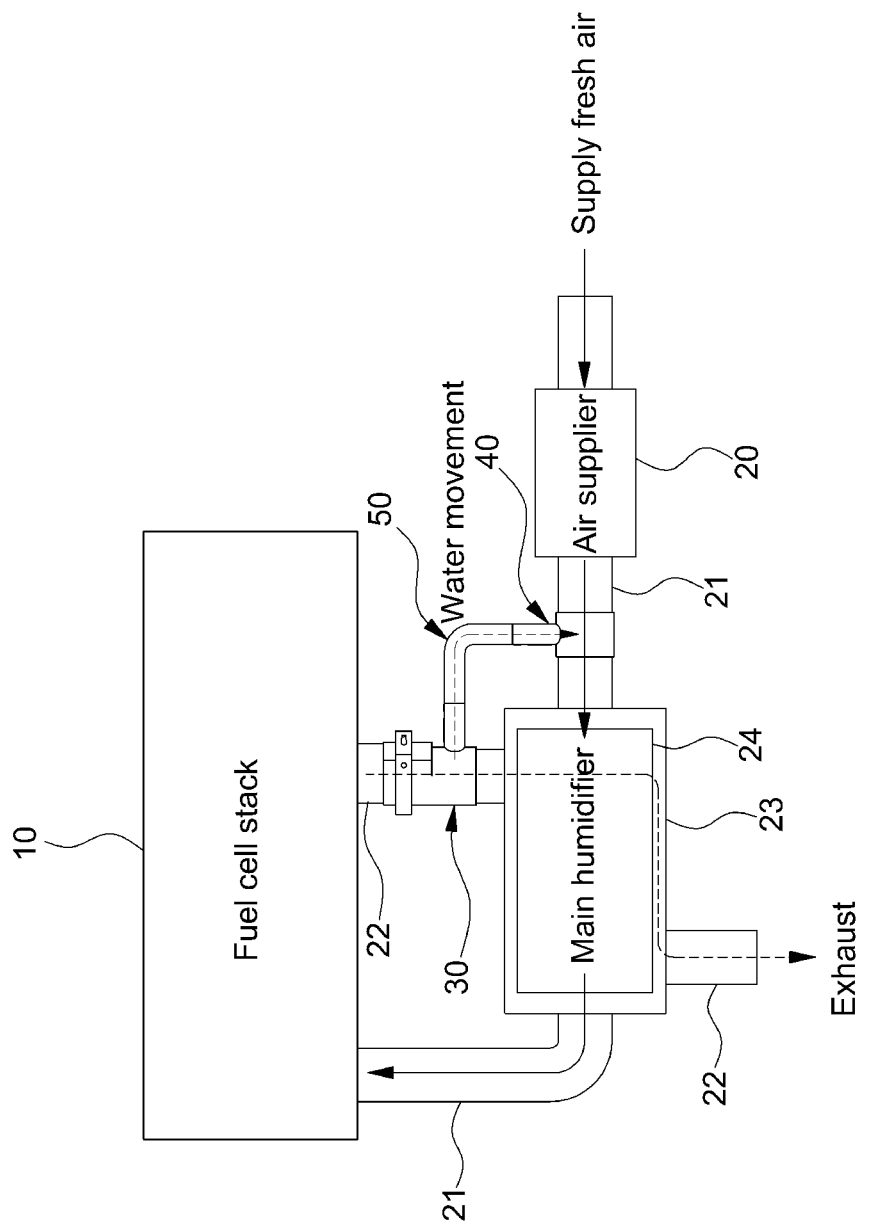
FIGS. 3 and 4 are schematic diagrams showing the configuration of a fuel cell stack comprising a humidifier in accordance with preferred embodiments of the present invention.
Figure 4:
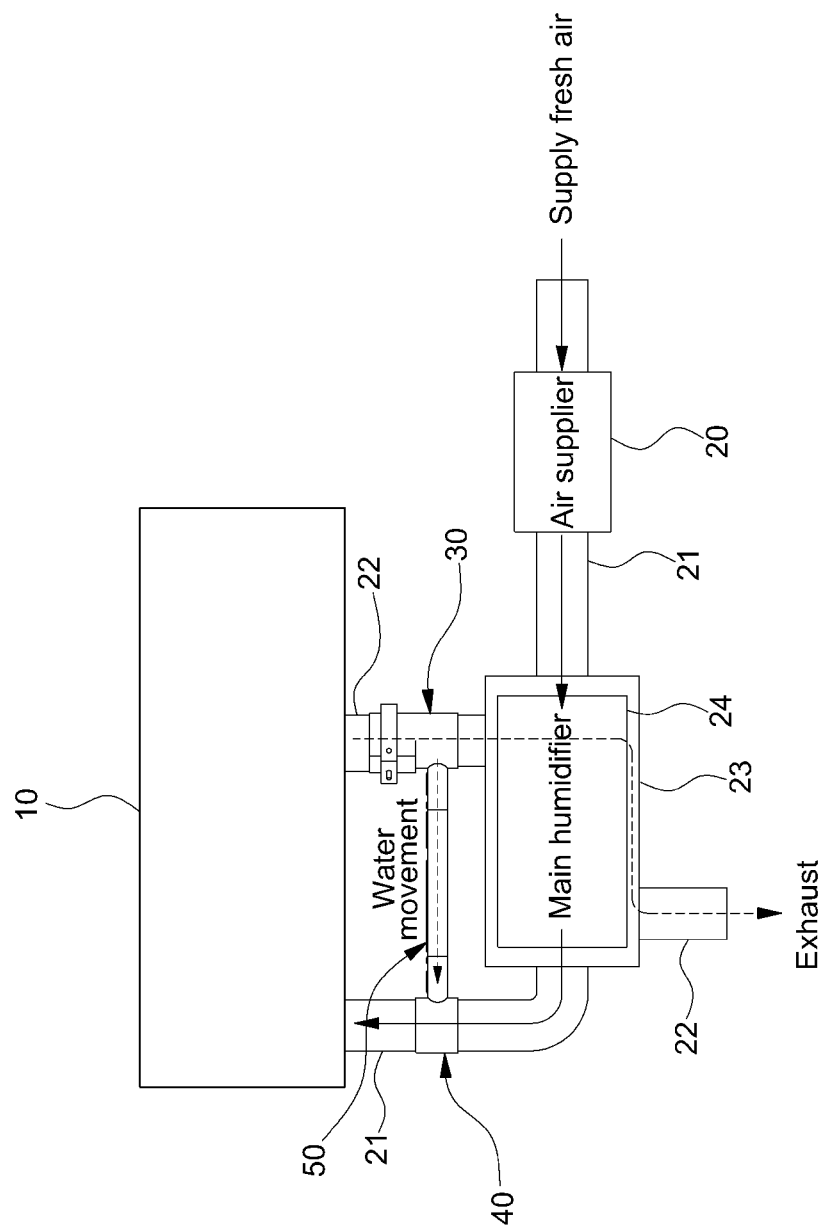

FIGS. 3 and 4 are schematic diagrams showing the configuration of a fuel cell stack 10 comprising a humidifier in accordance with preferred embodiments of the present invention, in which FIG. 3 shows the configuration of a fuel cell stack 10 where the humidifier is disposed between an air exhaust pipe 22 and an air supply pipe 21 in front of a main humidifier 23 and FIG. 4 shows the configuration of a fuel cell stack 10 where the humidifier is disposed between the air exhaust pipe 22 and the air supply pipe 21 in the rear of the main humidifier 23.

As shown in the figures, the humidifier of the present invention is provided between the air exhaust pipe 22, through which water-supersaturated exhaust gas is discharged from the fuel cell stack 10, and the air supply pipe 21, through which the gas to be humidified is supplied.

In particular, a structure is provided which allows the water, collected from the exhaust gas discharged from a cathode of the fuel cell stack 10 through the air exhaust pipe 22, i.e., collected from the supersaturated humid air, to move to the air supply pipe 21 by electroosmosis includes an inlet assembly 30 and an outlet assembly 40, which are provided with a branched structure at the air exhaust pipe 22 and the air supply pipe 21, respectively, and an electroosmotic pumping pipe 50 connecting the inlet assembly 30 and the outlet assembly 40.

Here, to humidify the air supplied to the fuel cell stack 10, the humidifier of the present invention can be configured in such a manner that the pumping pipe 50 is disposed between the air exhaust pipe 22 connected to a cathode outlet of the fuel cell stack 10 and the air supply pipe 21 connected to the front or rear end of the membrane humidifier as the main humidifier 23. A porous material can be disposed in the pumping pipe 50, and electrodes for applying a voltage can further be provided at both ends of the porous material.

In the fuel cell system, the supersaturated humid air discharged from the cathode outlet of the fuel cell stack 10 flows through the air exhaust pipe 22, and the air to be supplied to a cathode inlet of the fuel cell stack 10 flows through the air supply pipe 21.

According to embodiments of the present invention, the humidifier of the present invention can supply the water collected from the supersaturated humid air of the air exhaust pipe 22 to the air supply pipe 21 by the pumping force of the electroosmotic phenomenon, thus humidifying the air supplied to the fuel cell stack 10 through the air supply pipe 21.

In the embodiments of FIGS. 3 and 4, the membrane humidifier 23 is connected to an air supplier 20 through the air supply pipe 21, provided in front of the membrane humidifier 23. Air suctioned by an air blower, for example, can be supplied through the air supply pipe 21 to the membrane humidifier 23, and the membrane humidifier 23 can be connected to the air supply pipe 21 connected to the cathode inlet of the fuel cell stack 10. As such, air humidified by the membrane humidifier 23 is supplied to the fuel cell stack 10.

The membrane humidifier 23 can further be connected to the air exhaust pipe 22 in the front of the membrane humidifier, through which the supersaturated humid air discharged from the cathode outlet of the fuel cell stack 10 flows. An air exhaust pipe 22 can further be provided in the rear of the membrane humidifier 23 to discharge the air humidified by the membrane humidifier 23.

Therefore, when the supersaturated humid air discharged from the cathode outlet of the fuel cell stack 10 is supplied to the inside of a housing of the membrane humidifier 23 through the air exhaust pipe 22 in the front of the membrane humidifier 23, it transfers water and heat to the air passing through a hollow fiber membrane 24 and is then discharged to the outside through the air exhaust pipe 22 in the rear of the membrane humidifier 23.

Further, the external air (i.e., fresh air) transferred by the air supplier 20 through the air supply pipe 21 in the front of the membrane humidifier 23 passes through the hollow fiber membrane 24, during which it is humidified by the water and heat transferred from the saturated humid air supplied to the inside of the housing of the membrane humidifier 23, and is then supplied to the cathode of the fuel cell stack 10 through the air supply pipe 21 in the rear of the membrane humidifier 23.

In the humidifier of the present invention, the inlet assembly 30 can be provided in the air exhaust pipe 22 (e.g. in the middle of the air exhaust pipe 22 as shown in the figures, or otherwise suitably positioned in the air exhaust pipe 22) to pass the supersaturated humid air discharged from the fuel cell stack 10, collect water droplets contained in the supersaturated humid air, and supply the collected water droplets to the pumping pipe 50. The outlet assembly 40 can be provided in the air supply pipe 21 (e.g. in the middle of the air exhaust pipe 22 as shown in the figures, or otherwise suitably positioned in the air exhaust pipe 22) to pass the air supplied to the fuel cell stack 10 and inject the water flowing through the pumping pipe 50 into the air of the air supply pipe 21.

According to various embodiments, the electroosmotic pumping pipe 50 is provided and serves to transfer the water collected in the inlet assembly 30 to the outlet assembly 40 by the electroosmotic flow of the capillary in the porous material.

Figure 5:
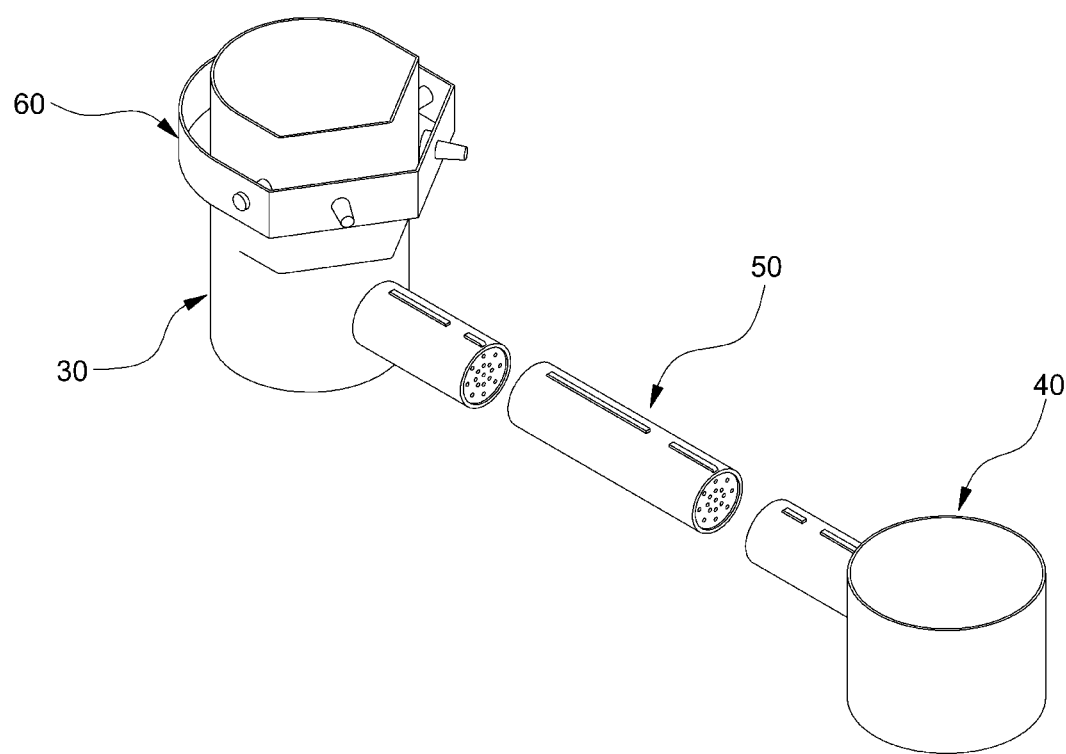
FIG. 5 is a perspective view showing the configuration of a humidifier in accordance with a preferred embodiment of the present invention.
Figure 6:
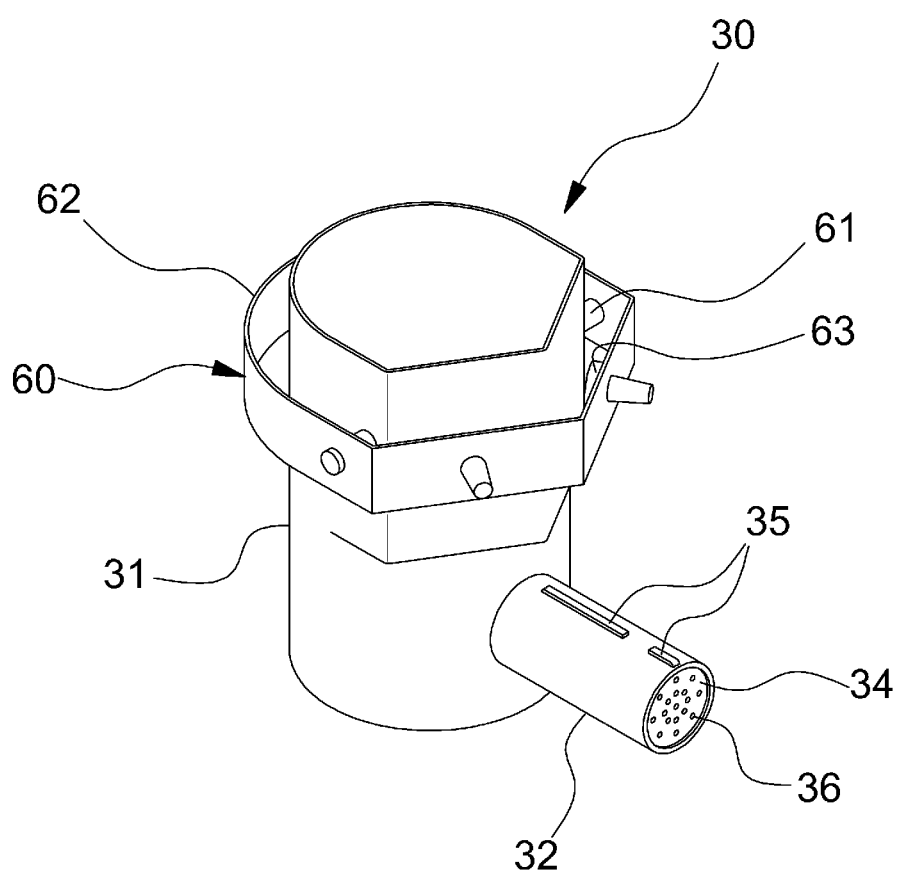
FIG. 6 is a perspective view showing an inlet assembly of the humidifier in accordance with an embodiment of the present invention.
Figure 7:
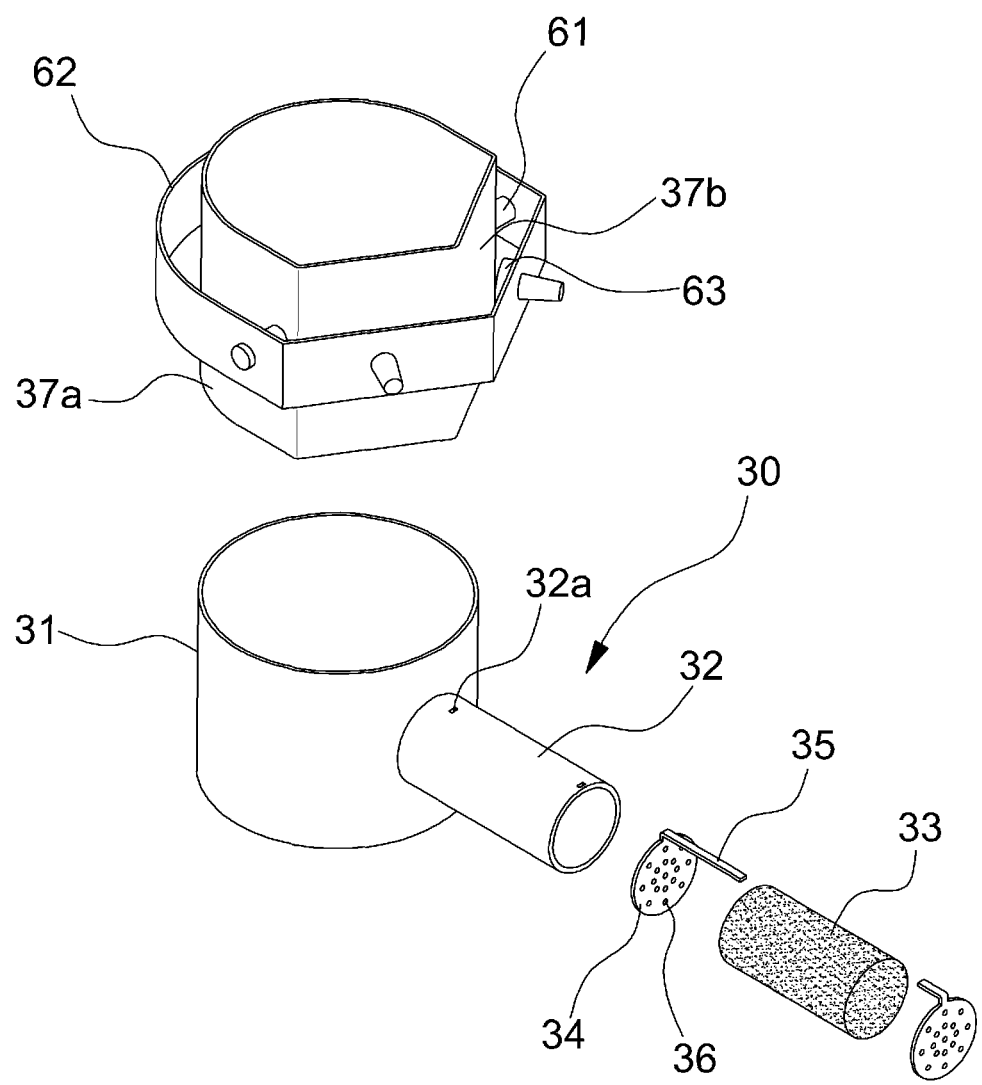
FIG. 7 is an exploded perspective view showing the inlet assembly of the humidifier in accordance with an embodiment of the present invention.
Figure 8:
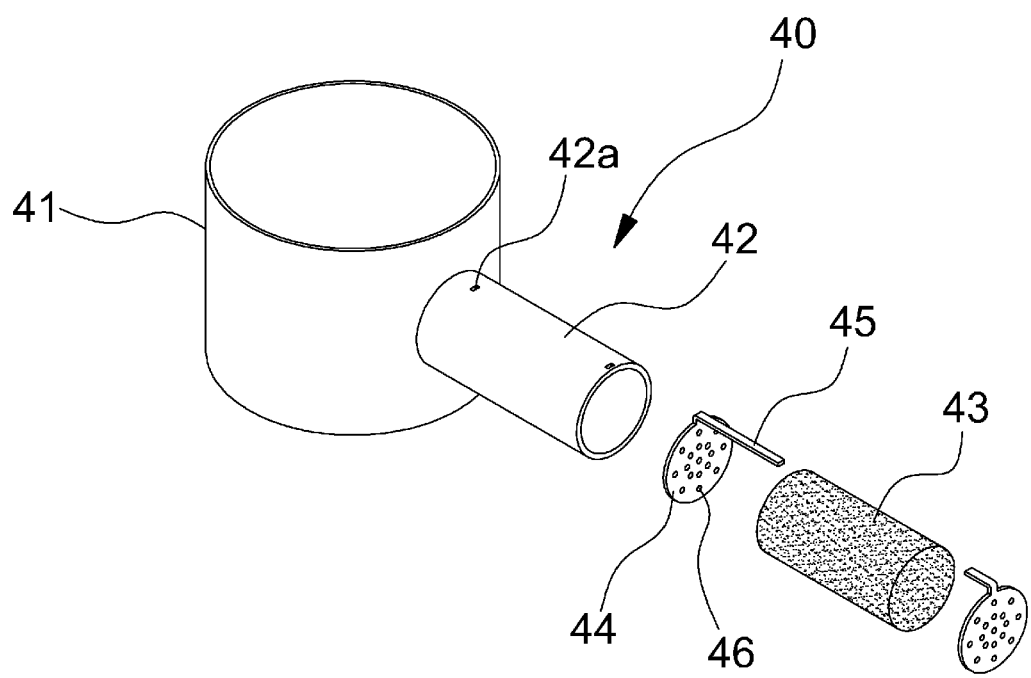
FIG. 8 is an exploded perspective view showing an outlet assembly of the humidifier in accordance with an embodiment of the present invention.
Figure 9:
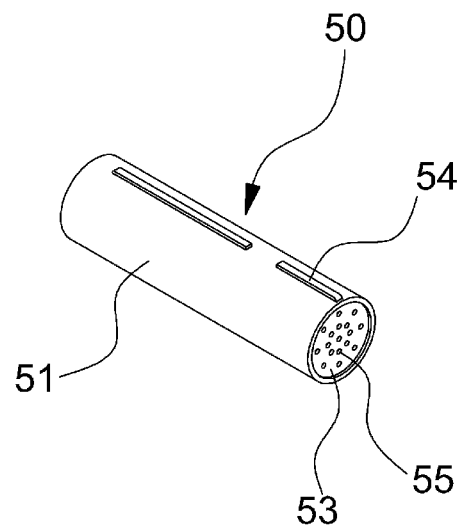
FIG. 9 is a perspective view showing a pumping pipe of the humidifier in accordance with an embodiment of the present invention.
Figure 10:
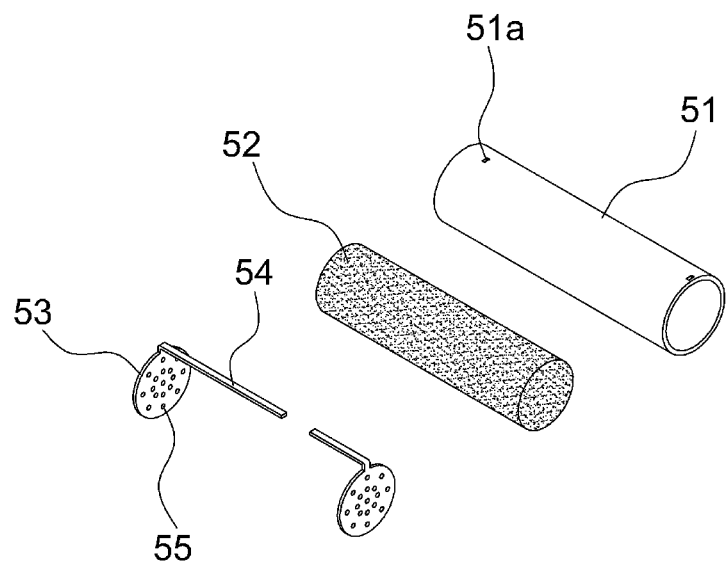
FIG. 10 is an exploded perspective view showing the pumping pipe of the humidifier in accordance with an embodiment of the present invention.

In more detail, FIG. 5 is a perspective view showing a configuration of the humidifier in accordance with a preferred embodiment of the present invention, FIG. 6 is a perspective view showing the inlet assembly of the humidifier in accordance with an embodiment of the present invention, FIG. 7 is an exploded perspective view showing the inlet assembly of the humidifier in accordance with an embodiment of the present invention, FIG. 8 is an exploded perspective view showing the outlet assembly of the humidifier in accordance with an embodiment of the present invention, FIG. 9 is a perspective view showing the pumping pipe of the humidifier in accordance with an embodiment of the present invention, and FIG. 10 is an exploded perspective view showing the pumping pipe of the humidifier in accordance with an embodiment of the present invention.

As shown in the figures, each of the inlet assembly 30 and the outlet assembly 40 has a branched structure, for example, a T-shaped pipe structure. For example, as shown, the inlet assembly 30 can comprise a connecting pipe 31 provided in the middle of the air supply pipe 21 and a port 32 branched from the connecting pipe 31, and the outlet assembly 40 comprises a connecting pipe 41 provided in the air exhaust pipe 22 (e.g. in the middle of the air exhaust pipe 22 or otherwise suitably positioned) and a port 42 branched from the connecting pipe 41.

For example, as shown, the port 32 of the inlet assembly 30 and the port 42 of the outlet assembly 40 can be connected to both ends of the pumping pipe 50, which pumps the water by the electroosmotic effect, and thus the pumping pipe 50 is configured to connect the inlet assembly 30 and the outlet assembly 40.

The port 32 branched from the connecting pipe 31 of the inlet assembly 30 corresponds to an outlet port of the inlet assembly 30 connected to the pumping pipe 50, and thus it is called the outlet port. Moreover, the port 42 branched from the connecting pipe 41 of the outlet assembly 40 corresponds to an inlet port of the outlet assembly 40 connected to the pumping pipe 50, and thus it is called the inlet port.

In a preferred embodiment, porous materials 33 and 43 for transferring the water by the electroosmotic effect are provided in the outlet port 32 of the inlet assembly 30 and the inlet port 42 of the outlet assembly 40, and electrodes 34 and 44 for applying a voltage to both ends of the porous materials 33 and 43 are provided at both ends of the outlet port 32 and the inlet port 42, respectively.

The electrodes 34 and 44 include leads 35 and 45 can be connected to a conducting wire for applying a voltage and formed on one side thereof, respectively. The leads 35 and 45 can extend to the outside of the outlet port 32 and the inlet port 42 through holes 32a and 42a formed in the outlet port 32 and the inlet port 42.

Since each of the electrodes 34 and 44 which are inserted into the corresponding inlet and outlet ports 32 and 42 are preferably provided to pass water, the electrodes 34 and 44 may be in the form of conductive plates having a mesh structure or other suitable structure in which a plurality of through holes 36 and 46, through which the water can pass, are formed.

The porous materials 33 and 43 are formed of any suitable dielectric material, such as porous ceramic or glass, and can be provided with micropores serving as a capillary path through which the water can be transferred by the electroosmotic effect.

According to various embodiments, the porous materials 33 and 43 may have a solid structure with a plurality of micropores. In some embodiments, the porous materials 33 and 43 may have a structure in which particles are filled between the electrodes 34 and 44 and packaged and, in this case, a conductive mesh may be further provided inside the electrodes 34 and 44 to prevent the particles from leaking.

The pumping pipe 50 can comprise a porous material 52 formed of a suitable dielectric material and provided inside a pipe 51 or the like, and electrodes 53 having a mesh structure, for example, similar to the ports 32 and 42 of the inlet assembly 30 and the outlet assembly 40. Likewise, each electrode 53 can include a lead 54 extending to the outside of the pipe 51 through a hole 51a formed in the pipe 51 and connected to a conducting wire for applying a voltage.

A plurality of pumping pipes 50 may be used in some embodiments according to the distance between the inlet assembly 30 provided in the air exhaust pipe 22 and the outlet assembly 40 provided in the air supply pipe 21. For example, the plurality of pumping pipes 50 may be connected to each other by any typical pipe connection method such as by using a fitting member or by a direct connection method using a screw.

The length of the pumping pipe 50 may be increased in such a manner that a plurality of porous materials are continuously arranged in one pipe having a required length and a plurality of pairs of electrodes can be provided at both ends of the array of the porous materials and in the middle of each porous material, the two electrodes provided at both ends of each porous material forming the pair.

In the above configuration, the inlet assembly 30 is a component that collects the condensed water from the supersaturated humid air discharged through the air exhaust pipe 22 and supplies the collected water to the pumping pipe 50. Thus, the amount of water condensed by cooling should be increased. For example, the inlet assembly 30 may include a cooling means 60 for forcibly cooling the wall of the inlet assembly 30, more particularly, the wall of the connecting pipe 31, to increase the amount of water condensed along the inner side of the connecting pipe 31.

The cooling means 60 forcibly cools the connecting pipe 31 such that a larger amount of water droplets are condensed and collected on the inner side of the connecting pipe 31 from the supersaturated humid air. In particular, the cooling means 60 increases the amount of water droplets collected such that a larger amount of water can be supplied to the pumping pipe 50, thereby improving the humidification performance.

As the cooling means 60 of the inlet assembly 30, it may be difficult in some embodiments to use a water cooling type of cooling means due to a limited space in terms of the layout. Therefore, it is preferable in various embodiments to employ an ultrasonic cooling means using acoustic streaming induced by ultrasonic vibration.

The ultrasonic cooling uses the principle that when an ultrasonic wave having a predetermined frequency (e.g., 30 kHz) is generated from an ultrasonic vibrator, the acoustic streaming induced by ultrasonic vibration creates air convection to cool a heat source, thus providing an excellent cooling effect in the fuel cell stack and the humidifier, where the amount of fresh air introduced is small.

The ultrasonic cooling means 60 can include ultrasonic vibrators 63, for example, spaced apart from each other at regular intervals around a portion 37a corresponding to the upstream side of the outlet port 32 with respect to the flow direction of the exhaust gas in the connecting pipe 31 of the inlet assembly 30.

Each ultrasonic vibrator 63 may in some embodiments be a piezoelectric element which receives external power and generates an ultrasonic wave having a predetermined frequency with vibration.

The ultrasonic vibrators 63 in the humidifier of the present invention can be mounted on a fixing bracket 62 spaced from the connecting pipe 31, in which a wall 37b of the connecting pipe 31 in a position opposite to the ultrasonic vibrator 63 is preferably substantially in parallel to the surface of the ultrasonic vibrator 63.

Referring to FIGS. 6 and 7, the fixing bracket 62 can be spaced from the periphery of the connecting pipe 31 by spacing members 61 provided in the connecting pipe 31 and, as shown in the figures, two ultrasonic vibrators 63 (or any suitable number) are provided in such a manner that the surface of each ultrasonic vibrator 63 is suitably positioned, e.g. substantially in parallel to the wall 37b of the connection pipe 31 with a predetermined gap.

The ultrasonic vibrators 63 can be operated by receiving electric power from an ultrasonic vibrator drive unit controlled by a control signal of a controller. In some embodiments, the ultrasonic vibrator drive unit may have a typical circuit configuration including an amplifier and the like, which is not shown in the figures.

As such, the configuration of the humidifier using electroosmosis, which can be used as an auxiliary humidifier of the fuel cell system, has been described. The operation of the humidifier can be controlled by the controller in such a manner that when a voltage is applied to the inlet assembly 30, the outlet assembly 40, and the electrodes 34, 44 and 53 of the pumping pipe 50 in response to a control signal of the controller, the water collected from the inlet assembly 30 moves along the current flow in the porous materials 33, 42 and 52 by electroosmosis, and the water moving to the outlet assembly 40 is supplied to the connecting pipe 41 to humidify the air supplied to the fuel cell stack 10 through the air supply pipe 21.

Next, the operation of the humidifier according to an embodiment of the present invention will be described.

First, when the supersaturated humid air at a relative humidify of 100% or more containing an excessive amount of water droplets is discharged from the cathode of the fuel cell stack 10 through the air exhaust pipe 22 and the connecting pipe 31 of the inlet assembly 30, water is condensed from the supersaturated humid air on the inner side of the connecting pipe 31, and a portion of the condensed water flowing on the inner side of the connecting pipe 31 is introduced into the pumping pipe 50 through the outlet port 32.

In this state, the porous materials 33 and 52 of the outlet port 32 and the pumping pipe 50 absorb and retain the water.

Subsequently, when the humidification load exceeds the capacity of the humidification according to the operating conditions of the fuel cell system, the controller applies a control signal for activating the auxiliary humidification, and a voltage is applied to the electrodes 34, 44, and 53 provided at both ends of each of the porous materials 33, 43 and 52 in response to the control signal.

When the voltage is applied, the humidifier of the present invention is operated to collect and transfer the water droplets condensed on the inner side of the inlet assembly 30 to the capillary tube. Therefore, the water introduced from the inlet assembly 30 by the operation of the pumping pipe 50 using electroosmosis is transferred to the outlet assembly 40 to humidify the air supplied to the fuel cell stack 10 through an air supply path (i.e., connecting pipe) of the outlet assembly 40.

At this time, the air supplied to the fuel cell stack 10 is humidified by the main humidifier 23 and, at the same time, further humidified by the humidifier of the present invention. Therefore, the humidification performance of the main humidifier 23 is improved by the humidifier of the present invention, thereby increasing the output of the fuel cell stack 10 and providing high efficiency operation.

In a case where the amount of water condensed in the inlet assembly 30 may be insufficient during the auxiliary humidification of the humidifier of the present invention, the controller may operate the ultrasonic cooling means 60.

That is, when the controller applies a control signal for activating the ultrasonic cooling, the ultrasonic vibrator drive unit applies electric power to each ultrasonic vibrator 63 to be operated, and thus an ultrasonic wave having a predetermined frequency is generated by the operation of the ultrasonic vibrators 63.

Therefore, the connecting pipe 31 of the inlet assembly 30 is forcibly cooled by the air convection caused by the acoustic streaming induced by ultrasonic vibration, and thus the amount of water droplets collected from the exhaust gas of the fuel cell stack 10 in the connecting pipe 31 of the inlet assembly 30 can be increased.

As described above, the humidifier for the fuel cell according to the present invention is used as an auxiliary humidifier provided together with the existing humidifier (e.g. gas-to-gas humidifier) to improve the humidification performance, particularly in a low efficiency region of the existing humidifier (e.g. gas-to-gas humidifier), thus increasing the output of the fuel cell and providing high efficiency operation.

Moreover, the humidifier for the fuel cell according to the present invention has a simpler structure than the existing humidifier using an injection technique, and thus it is possible to reduce the volume, weight, manufacturing cost, noise, etc. facilitate its control, and increase the durability due to the absence of a moving part.

Furthermore, it is possible to reduce and even prevent the deterioration of the vehicle cooling performance, which is caused by the conventional injection technique, to increase the amount of water droplets collected by local cooling using the cooling means, which uses the ultrasonic vibration and acoustic streaming effects, and to produce microdroplets, thus improving the humidification performance.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A humidifier for a fuel cell, the humidifier comprising:
a main humidifier that humidifies the air supplied to a cathode of the fuel cell stack;
an auxiliary humidifier that humidifies the air together with the main humidifier; and
a controller configured to operate the auxiliary humidifier;
wherein the auxiliary humidifier includes:
an inlet assembly provided in an air exhaust pipe, through which water-supersaturated exhaust gas is discharged from a fuel cell stack, to supply water condensed from the exhaust gas to the fuel cell stack,
an outlet assembly provided in an air supply pipe, through which a reactant gas to be humidified and supplied to the fuel cell stack passes, to supply the water transferred through a pumping pipe to the air supply pipe such that the reactant gas is humidified, and
the pumping pipe including a porous material disposed therein and electrodes for applying a voltage to both ends of the porous material and disposed between the inlet assembly and the outlet assembly such that the water is transferred through a capillary path in the porous material with a pumping force by electroosmosis when the electrodes apply a voltage,
wherein the inlet assembly of the auxiliary humidifier is provided in the air exhaust pipe connected to a cathode outlet of the fuel cell stack and the outlet assembly of the auxiliary humidifier is provided in the air supply pipe connected to a cathode inlet of the fuel cell stack to humidify the air supplied to a cathode of the fuel cell stack,
wherein the outlet assembly is provided in the air exhaust pipe in front or rear of the main humidifier for humidifying the air supplied to the cathode of the fuel cell stack, and
wherein the controller applies a control signal that operates the auxiliary humidifier by applying a voltage to the electrodes when a humidification load exceeds a capacity of the humidification according to operating conditions of the main humidifier.

2. The humidifier of claim 1, wherein each of the inlet assembly and the outlet assembly comprises a connecting pipe provided between the air exhaust pipe and the air supply pipe and a port branched from the connecting pipe and connected to an end of the pumping pipe.

3. The humidifier of claim 2, wherein each of the ports comprises a porous material disposed therein and electrodes for applying a voltage to both ends of the porous material such that the water is transferred through a capillary path in the porous material with a pumping force by electroosmosis when the electrodes apply a voltage.

4. The humidifier of claim 1, wherein each of the electrodes comprises a conductive plate having a mesh structure in which a plurality of through holes, through which the water passes, are formed, and a lead connected to a conducting wire for applying a voltage and extending to the outside.

5. The humidifier of claim 1, wherein the inlet assembly is provided in the air exhaust pipe connected to a cathode outlet of the fuel cell stack and the outlet assembly is provided in the air supply pipe connected to a cathode inlet of the fuel cell stack, thus humidifying the air supplied to a cathode of the fuel cell stack.

6. The humidifier of claim 5, wherein the outlet assembly is provided in the air supply pipe in front or rear of a main humidifier for humidifying the air supplied to the cathode of the fuel cell stack.

7. The humidifier of claim 1 wherein the inlet assembly comprises a cooling means for cooling a wall, through which the water-supersaturated exhaust gas passes, thus increasing the amount of water condensed on the wall.

8. The humidifier of claim 7, wherein the cooling means comprises:
   a fixing bracket fixed to the periphery of the connecting pipe of the inlet assembly connected to the air supply pipe and spaced from the periphery of the connecting pipe by a spacing member; and
   an ultrasonic vibrator provided on the fixing bracket,
   wherein the cooling means is an ultrasonic cooling means configured to induce acoustic streaming via ultrasonic vibration when electric power is applied to the ultrasonic cooling means.

* * * * *